(12) United States Patent
Vosoogh-Grayli et al.

(10) Patent No.: US 10,102,462 B2
(45) Date of Patent: Oct. 16, 2018

(54) OPTICALLY VARIABLE DATA STORAGE DEVICE

(71) Applicant: IE-9 Technology Corp., North Vancouver (CA)

(72) Inventors: Sasan Vosoogh-Grayli, North Vancouver (CA); Siamack Vosoogh-Grayli, North Vancouver (CA)

(73) Assignee: IE-9 Technology Corp., North Vancouver (CA)

( * ) Notice: Subject to any disclaimer, the term of this patent is extended or adjusted under 35 U.S.C. 154(b) by 0 days.

(21) Appl. No.: 15/289,916

(22) Filed: Oct. 10, 2016

(65) Prior Publication Data

US 2017/0032232 A1 Feb. 2, 2017

Related U.S. Application Data

(63) Continuation of application No. 14/727,865, filed on Jun. 2, 2015, now Pat. No. 9,489,604.

(Continued)

(51) Int. Cl.
*G06K 19/06* (2006.01)
*G06K 7/10* (2006.01)
*B82Y 20/00* (2011.01)

(52) U.S. Cl.
CPC ... *G06K 19/06037* (2013.01); *G06K 7/10722* (2013.01); *G06K 7/10821* (2013.01);
(Continued)

(58) Field of Classification Search
CPC ......... G06K 19/06037; G06K 19/0614; G06K 19/06084; G06K 7/10821; G06K 7/10722; B82Y 20/00; Y10S 977/943
See application file for complete search history.

(56) References Cited

U.S. PATENT DOCUMENTS 4,721,217 A * 1/1988 Phillips ............... B65D 55/066
206/459.1
4,765,656 A 8/1988 Becker et al.
(Continued)

FOREIGN PATENT DOCUMENTS

EP 0490923 B1 6/1992
EP 0858056 A2 8/1998
(Continued)

OTHER PUBLICATIONS

Galitonov et al., "High Capacity Tagging Using Nanostructured Diffraction Barcodes", Optics Express, vol. 14, No. 4, Feb. 20, 2006, pp. 1382-1387.
(Continued)

*Primary Examiner* — Daniel Walsh
(74) *Attorney, Agent, or Firm* — Corridor Law Group, P.C.

(57) ABSTRACT

An optically variable device uses a data storage layer with a nano-optical bit system to store data. The optically variable device encodes the data using spectral signatures (such as colors) as variables. In some embodiments, the optically variable device uses angle multiplexing to store machine-readable data and an image. The optically variable device can be used as a secure data storage medium for a large volume of data. The storage capacity can be increased by increasing the number of color variables and by introducing additional variables such as intensity and polarization.

16 Claims, 14 Drawing Sheets

Related U.S. Application Data

(60) Provisional application No. 62/007,338, filed on Jun. 3, 2014.

(52) U.S. Cl.
    CPC ... G06K 19/0614 (2013.01); G06K 19/06084 (2013.01); *B82Y 20/00* (2013.01); *Y10S 977/943* (2013.01)

(56) References Cited

U.S. PATENT DOCUMENTS

| | | | | |
|---|---|---|---|---|
| 5,101,184 | A * | 3/1992 | Antes | G03H 1/30 235/454 |
| 5,461,239 | A * | 10/1995 | Atherton | G06K 1/126 235/494 |
| 5,549,953 | A * | 8/1996 | Li | G02B 5/285 369/283 |
| 5,591,527 | A * | 1/1997 | Lu | B42D 25/29 283/72 |
| 5,621,515 | A * | 4/1997 | Hoshino | G03H 1/041 235/457 |
| 5,786,910 | A * | 7/1998 | Walters | G06K 19/18 235/380 |
| 5,811,775 | A * | 9/1998 | Lee | G06K 7/10861 235/457 |
| 5,856,048 | A * | 1/1999 | Tahara | B41M 3/14 283/85 |
| 6,043,936 | A | 3/2000 | Large | |
| 6,052,354 | A * | 4/2000 | Gudesen | G11B 7/0033 369/100 |
| 6,060,143 | A * | 5/2000 | Tompkin | G06K 19/06046 369/275.1 |
| 6,280,891 | B2 * | 8/2001 | Daniel | G06K 7/10732 283/86 |
| 6,342,969 | B1 | 1/2002 | Lee | |
| 6,343,745 | B1 * | 2/2002 | Bohm | G06K 19/06196 235/493 |
| 6,502,757 | B1 * | 1/2003 | Iwamoto | B82Y 10/00 235/457 |
| 6,817,530 | B2 | 11/2004 | Labrec et al. | |
| 6,822,769 | B1 * | 11/2004 | Drinkwater | G03H 1/0011 283/86 |
| 6,974,080 | B1 | 12/2005 | Goggins | |
| 7,063,260 | B2 | 6/2006 | Mossberg | |
| 7,074,478 | B2 | 7/2006 | Abraham | |
| 7,267,280 | B2 | 9/2007 | Lubow | |
| 7,341,189 | B2 | 3/2008 | Mossberg | |
| 7,498,574 | B2 | 3/2009 | Puscasu et al. | |
| 7,989,254 | B2 | 8/2011 | Yoon | |
| 7,995,196 | B1 * | 8/2011 | Fraser | G06K 9/00577 356/71 |
| 8,171,567 | B1 * | 5/2012 | Fraser | G06T 1/0021 713/176 |
| 8,308,197 | B2 | 11/2012 | Peters et al. | |
| 8,496,841 | B2 | 7/2013 | Yoon | |
| 8,599,486 | B2 | 12/2013 | Najiminani et al. | |
| 8,770,487 | B2 * | 7/2014 | Toda | G02B 5/1814 235/375 |
| 9,333,797 | B2 * | 5/2016 | Toda | G02B 5/1814 |
| 9,764,684 | B2 * | 9/2017 | Takahashi | B60Q 1/2669 |
| 2001/0005570 | A1 * | 6/2001 | Daniel | G06K 7/10732 430/321 |
| 2001/0043396 | A1 | 11/2001 | Lee | |
| 2002/0021445 | A1 * | 2/2002 | Bozhevolnyi | B82Y 20/00 356/445 |
| 2002/0030360 | A1 * | 3/2002 | Herrmann | B42D 25/29 283/72 |
| 2003/0010830 | A1 | 1/2003 | Curtis | |
| 2003/0039195 | A1 * | 2/2003 | Long | G03H 1/041 369/103 |
| 2003/0042487 | A1 | 3/2003 | Sarychev et al. | |
| 2003/0095416 | A1 * | 5/2003 | Huizenga | B60Q 1/2669 362/501 |
| 2003/0155495 | A1 * | 8/2003 | Drinkwater | G02B 5/1842 250/237 R |
| 2003/0157305 | A1 * | 8/2003 | Abraham | G06K 19/06037 428/195.1 |
| 2003/0174373 | A1 * | 9/2003 | Drinkwater | G03H 1/0011 359/15 |
| 2003/0179364 | A1 * | 9/2003 | Steenblik | B82Y 20/00 356/71 |
| 2004/0100707 | A1 | 5/2004 | Kay et al. | |
| 2004/0123895 | A1 * | 7/2004 | Kardauskas | G02B 5/1861 136/244 |
| 2004/0179266 | A1 * | 9/2004 | Schilling | B42D 25/328 359/558 |
| 2004/0240006 | A1 * | 12/2004 | Staub | G06K 19/06046 359/2 |
| 2005/0010776 | A1 * | 1/2005 | Kenen | G06Q 20/341 713/176 |
| 2005/0029799 | A1 * | 2/2005 | Collinson | G09F 21/02 283/86 |
| 2005/0038756 | A1 * | 2/2005 | Nagel | G06K 19/086 705/76 |
| 2005/0040240 | A1 * | 2/2005 | Jones | G06K 7/1417 235/487 |
| 2005/0118537 | A1 * | 6/2005 | Lutz | B41M 3/14 430/338 |
| 2005/0128543 | A1 * | 6/2005 | Phillips | B32B 27/36 359/15 |
| 2005/0199724 | A1 * | 9/2005 | Lubow | G06K 7/1434 235/462.01 |
| 2005/0242194 | A1 | 11/2005 | Jones et al. | |
| 2006/0022059 | A1 | 2/2006 | Juds | |
| 2006/0055993 | A1 * | 3/2006 | Kobayashi | G03H 1/02 359/3 |
| 2006/0226953 | A1 * | 10/2006 | Shelley | B60R 25/00 340/5.62 |
| 2006/0232379 | A1 * | 10/2006 | Shelley | E05B 81/76 340/5.62 |
| 2006/0262367 | A1 * | 11/2006 | Hattori | B41M 3/14 359/15 |
| 2007/0081246 | A1 | 4/2007 | Stuck et al. | |
| 2007/0109643 | A1 * | 5/2007 | Lee | B42F 1/00 359/566 |
| 2007/0110317 | A1 | 5/2007 | Davis et al. | |
| 2007/0111107 | A1 | 5/2007 | Yoshinari et al. | |
| 2008/0024847 | A1 | 1/2008 | Kittler et al. | |
| 2008/0024866 | A1 * | 1/2008 | Walter | B82Y 20/00 359/569 |
| 2008/0160226 | A1 * | 7/2008 | Kaule | B42D 25/21 428/29 |
| 2008/0165079 | A1 | 7/2008 | Smith et al. | |
| 2008/0290175 | A1 | 11/2008 | Chen et al. | |
| 2009/0072526 | A1 | 3/2009 | Peters et al. | |
| 2009/0316238 | A1 | 12/2009 | Drinkwater | |
| 2010/0001509 | A1 * | 1/2010 | Whiteman | B82Y 20/00 283/91 |
| 2010/0037326 | A1 | 2/2010 | Batistatos et al. | |
| 2010/0307705 | A1 * | 12/2010 | Rahm | B42D 25/29 162/140 |
| 2011/0049862 | A1 | 3/2011 | Hill | |
| 2011/0170305 | A1 * | 7/2011 | Tanaka | B60Q 1/2669 362/501 |
| 2011/0317271 | A1 * | 12/2011 | Dunn | G07D 7/0006 359/619 |
| 2012/0074684 | A1 * | 3/2012 | Marchant | B42D 25/29 283/85 |
| 2012/0168506 | A1 | 7/2012 | Ruehrmair et al. | |
| 2013/0106092 | A1 | 5/2013 | Holmes | |
| 2013/0147180 | A1 | 6/2013 | Batistatos et al. | |
| 2013/0207275 | A1 | 8/2013 | Eichenberger et al. | |
| 2013/0269865 | A1 * | 10/2013 | Drinkwater | B42D 15/025 156/234 |
| 2014/0307321 | A1 * | 10/2014 | Schilling | B44F 7/00 359/571 |
| 2015/0258837 | A1 * | 9/2015 | Ritter | B41M 3/148 283/67 |

(56) References Cited

U.S. PATENT DOCUMENTS

| | | | |
|---|---|---|---|
| 2015/0347887 A1* | 12/2015 | Vosoogh-Grayli | G06K 19/06037 235/454 |
| 2016/0167422 A1* | 6/2016 | Brehm | G02B 5/1809 359/567 |
| 2016/0257160 A1* | 9/2016 | Firth | B82Y 20/00 |
| 2016/0297353 A1* | 10/2016 | Takahashi | B60Q 1/2669 |
| 2016/0297354 A1* | 10/2016 | Takahashi | B60Q 1/2669 |
| 2016/0307035 A1* | 10/2016 | Schilling | G07D 7/128 |

FOREIGN PATENT DOCUMENTS

| | | |
|---|---|---|
| EP | 1814743 B1 | 8/2007 |
| EP | 2054242 B1 | 2/2010 |
| EP | 2024447 B1 | 6/2011 |
| EP | 2152526 B1 | 9/2011 |
| EP | 1862827 A1 | 5/2012 |
| WO | 1993018419 A1 | 9/1993 |
| WO | 2002000445 A1 | 1/2002 |
| WO | 2005029400 A2 | 3/2005 |
| WO | 2005086075 A1 | 9/2005 |
| WO | 2006025980 A2 | 3/2006 |
| WO | 2007085808 A1 | 8/2007 |
| WO | 2007137438 A1 | 12/2007 |
| WO | 2012136777 A1 | 10/2012 |
| WO | 2013039454 A1 | 3/2013 |
| WO | 2013060817 A1 | 5/2013 |

OTHER PUBLICATIONS

Chrotowski, "Nano-engineered lenses", Nature Photonics vol. 4, Jul. 2010, pp. 413-415.

Grayli et al., "Light Filtering Using Sub-Wavelength Periodic Structures on Polymer Material", Proc. of SPIE, vol. 8007, 2011, pp. 800712-1 to 800712-7.

Grayli et al., "Data Encoding Using Periodic Nano-Structures", Proc. of SPIE, vol. 8412, 2012, pp. 841214-1 to 841214-11.

Vosoogh-Grayli, "Diffractive Nano-Structures as Optical Visual and Machine Readable Features", MASc Thesis, SFU 2012.

* cited by examiner

OPTICALLY VARIABLE DATA STORAGE DEVICE

CROSS-REFERENCE TO RELATED APPLICATIONS

This application is a continuation of U.S. patent application Ser. No. 14/727,865 filed on Jun. 2, 2015, entitled "Optically Variable Data Storage Device". The '865 application claimed priority benefits, in turn, from U.S. Provisional Application No. 62/007,338 having a filing date of Jun. 3, 2014, entitled "Optically Variable Data Storage Device". The '865 and '338 applications are hereby incorporated in their entireties by reference.

With respect to the above-mentioned parent application, to the extent any amendments, characterizations or other assertions previously made in any such related patent applications or patents, including any parent, co-pending or continuing application with respect to any art, prior or otherwise, could be construed as a disclaimer of any subject matter supported by the disclosure of the present application, such disclaimer is hereby rescinded and retracted. Prior art previously considered in any related patent application(s) or patent(s), including any parent, co-pending or continuing application, should be reconsidered with respect to the subject matter being claimed in the present application.

FIELD OF THE INVENTION

The present invention relates to optically variable devices (OVDs) for data storage and data representation, the fabrication of OVDs and, in particular, to the storing of digital information using nano-optical structures.

BACKGROUND OF THE INVENTION

Angle-Multiplexed Hologram Storage

Angle-multiplexed hologram storage techniques can be used to store multiple images in an area on a holographic film. Angle-multiplexed hologram techniques can also be used to store multiple images via diffractive structures located in a material or on the surface of the material. Disadvantages of angle-multiplexed hologram techniques include their complexity, and limitations such as the use of binary variables which limits their security, and the slow write speed which makes them unsuitable as a real-time storage device.

Diffractive Nanostructures

Diffractive nanostructures can be used to store data on the surface of materials by exploiting the particular optical effects they create. Data can be encoded and represented in a multi-state system where colors or wavelengths can be used as variables. Since a data storage approach based on diffractive nanostructures takes advantage of a multivariable system to represent the data, the approach results in stored data that is more difficult to decode and therefore is more secure than other techniques.

The high resolving power of nano-scale diffraction gratings enables the detection of distinct spectral signatures, such as colors or wavelengths, and provides inherent physical data compression. The use of diffractive nano-structures can allow large amounts of data to be stored and encrypted optically in a small surface area. The approach can provide methods for authentication as well as machine-readability of stored data.

An image comprising diffractive pixels can exhibit color changes of higher intensity than holograms. In this context, the term pixel refers to a nano-structure or equivalently a nano-optical bit. Using diffraction gratings at varying angles, angle-dependent optical effects can be achieved by changing the illumination angle. Multiple images can be stored on top of each other on the same area of the surface, and visualization of each image can be enabled by selecting the direction and angle of incident light. Where there are multiple images, only one of the stored images can be seen at a given incidence angle, i.e., when the incidence angle is normal to the grating corresponding to the selected image.

The pixels used to construct each image can be square, rectangular, circular, oval or another suitable shape. The perceived color from each pixel depends on the orientation and periodicity of the grating used in the pixels. The periodicity of the grating generally ranges from 20 nm to 200 µm. The size of the pixels also varies depending on the periodicity of the grating. By choosing the periodicity carefully, the color of a digital image can be mimicked once it is translated into a diffractive image at a particular angle of incident light.

Diffractive images with improved control over a wide range of viewing angles per color can be fabricated by using a suitable type of grating design. Brighter and more eye-catching diffractive images can be achieved by modifying the periodicity of each pixel. The diffractive images can be stored in multiple layers via techniques such as imprinting, casting and the like.

SUMMARY OF THE INVENTION

An optically variable storage device comprises
(a) a data storage layer, the data storage layer comprising a plurality of nano-optical bits; and
(b) an upper layer above the data storage layer and a lower layer below the data storage layer, the upper layer and the lower layer comprising at least one of a dielectric material and a metallic material. The optically variable storage device is operable to store data in the data storage layer and an image using angle multiplexing. The nano-optical bits encode the data in the data storage layer using spectral signatures as variables. The spectral signatures can comprise colors or wavelengths.

In some embodiments, each of the plurality of nano-optical bits comprises an array of diffractive nano-structures.

The upper and lower layers can serve at least one of the following functions: protecting the data storage layer, enhancing a brightness of the optically variable device, concealing a coded pattern, and changing an optical path. At least one of the upper and lower layers can comprise one or more diffraction gratings operable to conceal the coded pattern.

In some embodiments of the optically variable storage device, the image is stored in a different layer from the data storage layer.

In some embodiments, the image is selectively viewed using illumination in a first direction and at a first incidence angle, and the data is selectively read from the nano-optical bits using illumination in a second direction and at a second incidence angle. For example, the second incidence angle can be orthogonal to the first incidence angle.

The optically variable storage device can be configured to store a second image. The second image can be selectively viewed using illumination in a third direction and at a third incidence angle.

In the embodiments described herein, the optically variable storage device comprises data that is machine-readable.

Images stored in the optically variable storage device can be diffractive images and/or printed images. A diffraction grating can be interposed between the data storage layer and the printed image. The printed image is viewed through the diffraction grating at a first viewing angle the printed image has a first coloring, and when the printed image is viewed through the diffraction grating at a second viewing angle the printed image has a second coloring.

In some embodiments, the number of variables used to store data in the optically variable storage device can be increased. For example, the nano-optical bits can encode data in the data storage layer using orientation of the nano-optical bits as variables.

The nano-optical bits can encode data in the data storage layer using spectral signatures as variables and using as variables at least one of intensity and polarization of light received from the optically variable storage device in response to illumination of the data storage layer.

In some embodiments, a first nano-optical bit comprise an array of nano-structures having a first three-dimensional profile and a second nano-optical bit comprises an array of nano-structures having a second three-dimensional profile. For example, the three-dimensional profile can comprise an approximately circular indentation in a substrate.

In other embodiments, a first nano-optical bit comprises an array of nano-structures having a first diffractive harmonic structure and a second nano-optical bit comprises an array of nano-structures having a second diffractive harmonic structure.

In yet further embodiments, a first nano-optical bit comprises an array of nano-structures having a first thickness and a second nano-optical bit comprises an array of nano-structures having a second thickness.

In some embodiments, each of the plurality of nano-optical bits in the optically variable storage device comprises an array of plasmonic structures. A first nano-optical bit of the plurality of nano-optical bits comprises a first array of plasmonic structures having a first periodicity and a second nano-optical bit of the plurality of nano-optical bits comprises a second array of plasmonic structures having a second periodicity.

In some embodiments, the data storage layer of the optically variable storage device comprises one or more diffractive barcodes. For example, the diffractive barcode can be a 2D barcode such as a QR code.

A biometric optical reader comprises:

(a) a transparent platform supporting a biometric feature, the transparent platform overlying a coded structure formed on a transparent substrate;

(b) a light source operable to illuminate the biometric feature and the coded structure;

(c) a light detector operable to record a beam reflected from the biometric feature and the coded structure, the beam comprising a convolution of reflections from the biometric feature and the coded structure; and (d) a decoder configured to extract one or more elements of the biometric feature.

In some embodiments, the coded structure comprises a plurality of nano-optical bits, each of the plurality of nano-optical bits comprising an array of diffractive nano-structures.

The biometric feature can be a fingerprint, for example.

DETAILED DESCRIPTION OF CERTAIN EMBODIMENTS

Conventional data storage techniques have limitations on data density, real-time operation, and the level of data security that can be provided. Typically, existing data storage techniques rely on binary variables.

The technology described in this application can increase the number of variables, and can provide a single integrated device that can combine overt data (such as a printed image) with covert, machine-readable data encoded with a high level of data security.

Nano-Optical Bit Data Storage with Secondary Layers

Figure 1A:
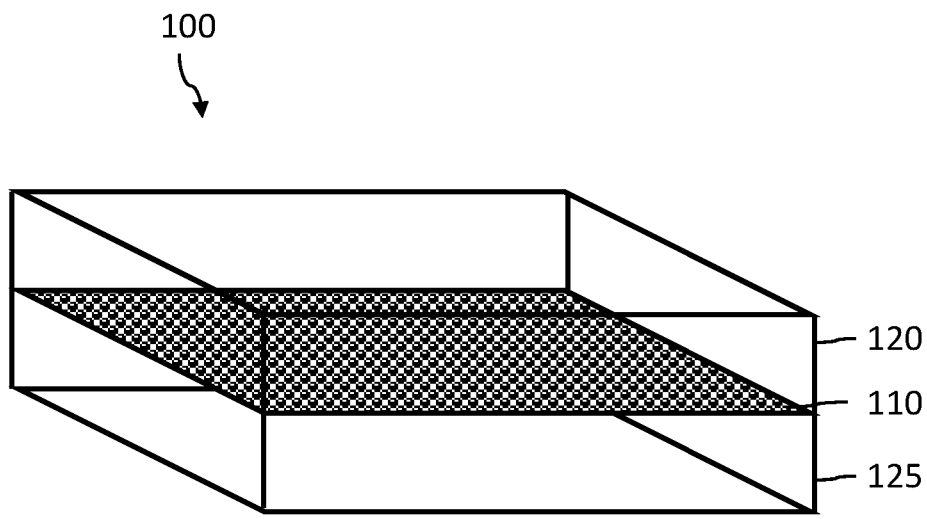
FIG. 1A is a schematic diagram of an optically variable device (OVD).

FIG. 1A is a schematic diagram of an embodiment of optically variable device (OVD) 100. OVD 100 comprises data storage layer 110 that uses a nano-optical bit system to store data. OVD 100 further comprises upper layer 120 and lower layer 125. Layers 120 and 125 can comprises dielectric materials or metallic materials. OVD 100 can comprise layers (not illustrated in FIG. 1A) on the side of data storage layer 110, in addition to, or instead of, layers 120 and 125. Side layers extend in a plane orthogonal to upper and lower layers 120 and 125. Layers 120 and 125, and side layers if present, can provide a number of benefits including, but not limited to, the following:

acting as protective layers,
enhancing the brightness,
concealing a coded pattern, and
changing the optical path (depending on the refractive indices of the materials that are used).

In some implementations, OVD 100 comprises a series of diffraction gratings incorporated into layers 120 and/or 125. The series of diffraction gratings can be used to conceal the coded pattern, if desired.

OVD 100 is suitable for use as a data recording/storage medium for applications in which a large volume of data needs to be stored. The storage capacity of OVD 100 can be increased by increasing the number of variables used in the nano-optical bit encoding system, and the number of values each variable can assume. For example, if two adjacent nano-optical bits in data storage layer 110 exhibit the same color, then the combination of two bits can be jointly represented by a new color. The storage capacity of OVD 100 can also be increased by decreasing the size of the nano-optical bit structures. Increasing the data storage capacity increases the volume of data that can be stored within a given surface area.

It should be understood that, in the examples described in this application, references to color include wavelength and, more generally, spectral signature.

Figure 1B:
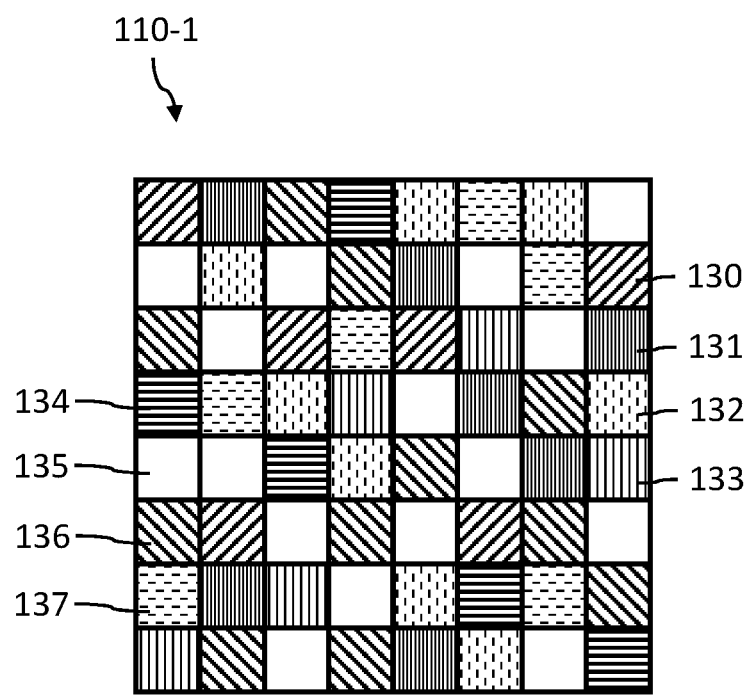
FIG. 1B is a schematic diagram of a plan view of a portion of the data storage layer of FIG. 1A.

FIG. 1B is a schematic diagram of a plan view of portion 110-1 of data storage layer 110 of FIG. 1A. FIG. 1B illustrates the nano-optical bit encoding system. Pixels 130 through 137 of portion 110-1 of the data storage layer comprise diffractive structures encoding the data stored on OVD 100. In a colored illustration, pixels 130 through 137 would be represented by different colors such as red, blue, green, yellow and the like. In the black and white illustration of FIG. 1B the different pixels types, 130 through 137, are shown with different shading patterns.

Figure 2A:
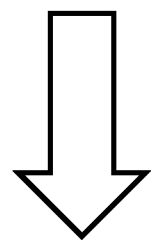
FIGS. 2A and 2B are illustrations of an OVD, such as the OVD of FIG. 1A, operable to display an image and to store data using directional multiplexing
Figure 2A:
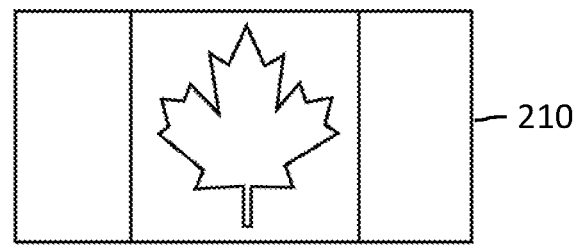
Figure 2B:
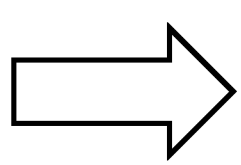
Figure 2B:
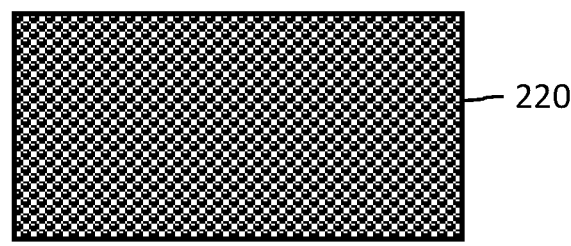

FIGS. 2A and 2B are illustrations of an OVD, such as OVD 100 of FIG. 1, operable to display an image and to store data using directional multiplexing. FIGS. 2A and 2B illustrate the result of illuminating the surface of a data storage layer, such as data storage layer 110 of FIG. 1A.

As shown in FIG. 2A, illumination of the surface of the data storage layer along the y-axis (as indicated by the arrow), in this particular example, reveals optically variable image 210. In the example illustrated in FIG. 2A, optically variable image 210 is an image of a facsimile of a Canadian flag. Though FIG. 2A is shown in black and white, optically variable image 210 comprises a color image.

As shown in FIG. 2B illumination of the surface of the data storage layer along the x-axis (as indicated by the arrow), in this particular example, reveals nano-optical bit structures 220 that can be used to store data.

The OVD illustrated in FIGS. 2A and 2B comprises a combination of a diffractive image and a data recording system. The stored information can be visualized by angular multiplexing and using illumination at a predetermined direction and incidence angle. The OVD operates in two or more directions, one direction dedicated to the stored data and the other directions used to store one or more diffractive images. The angle at which stored data is read from the nano-optical bits is selected so that there is little or no interference from the structures comprising images visible by illuminating in other viewing directions.

More data layers can be added using multiplexing techniques to increase the data storage capacity of the OVD. In one embodiment, adding multiplexing techniques can include using multiple storage layers, each storage layer storing data in at least one direction. In one implementation, the data storage and the image(s) are on different layers, for example one layer comprising only stored data and another layer storing one or more diffractive images.

As described above, the OVD provides information from at least two viewing directions, as for example illustrated in FIGS. 2A and 2B in which the diffractive image and the encoded data are viewed from orthogonal directions.

An OVD, such as OVD 100 of FIG. 1, with a data storage layer, such as illustrated in FIGS. 2A and 2B, provides integration of image and data storage in a single device. The data storage comprises machine-readable (i.e., coded) data.

The OVD can be used to provide both overt and covert information in a single device, such as an identification card. Overt information is provided via the image, for example, and is easy to authenticate. Covert information is machine-readable and can be secure.

Printed Picture Embodiment

Figure 3:
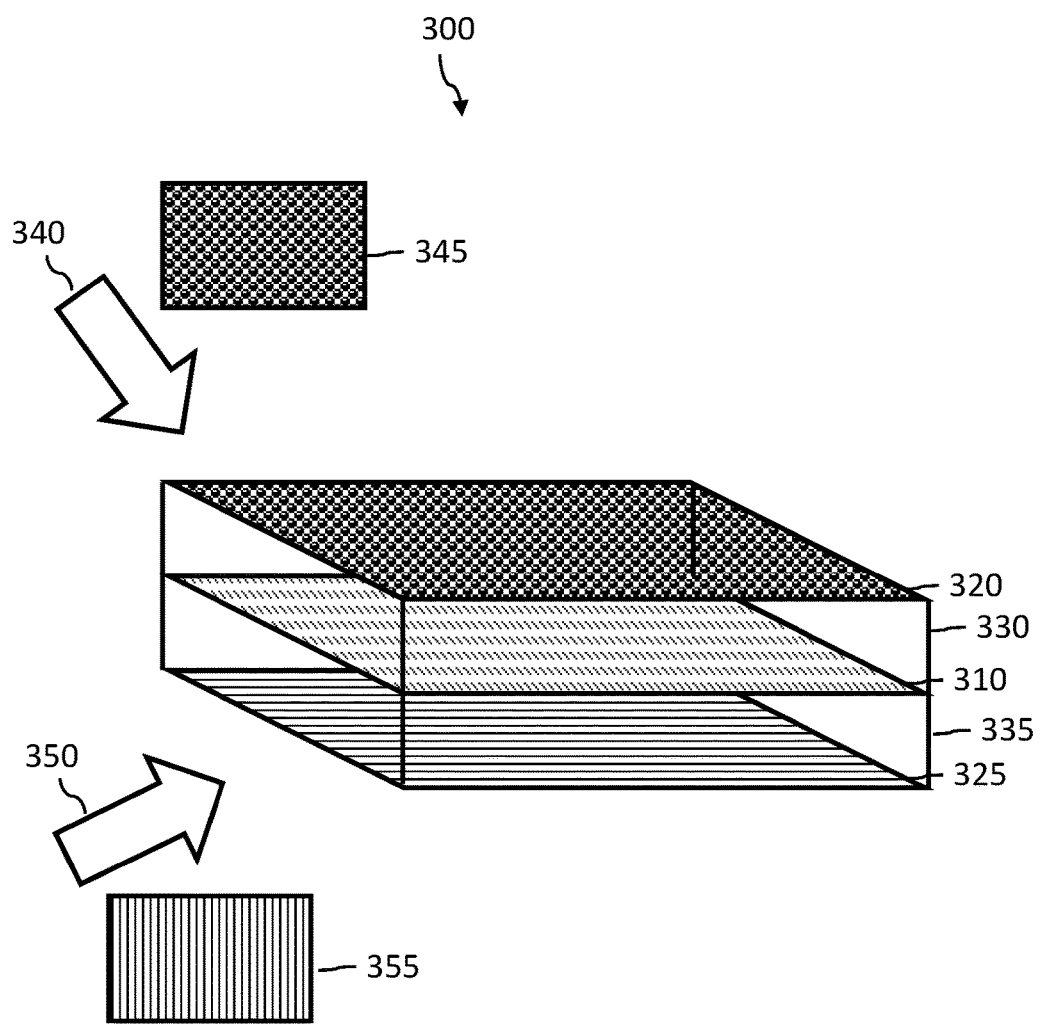
FIG. 3 is a schematic diagram of an OVD operable to store data and a printed image.

FIG. 3 is a schematic diagram of an embodiment of OVD 300 operable to store data and a printed image. A multilayer OVD can be constructed from two or more layers. In the embodiment illustrated in FIG. 3, one layer acts as a medium to store data using nano-optical bits and another layer is a color (or monochromatic) printed image. The printed image can be a high resolution image. OVD 300 comprises diffraction grating 310, stored data layer 320, and printed picture layer 325. OVD 300 further comprises layers 330 and 335 of dielectric or metallic materials that can provide the benefits described above in reference to FIG. 1A.

By taking advantage of angular/directional multiplexing techniques, the stored data can be extracted while the image(s) on other layer(s) are invisible to an observer. In OVD 300, the data storage layer can be replaced by one or more layers on which one or more diffractive images can be stored.

Diffraction grating 310 placed above printed image layer 325 can be used to cause a color change to the printed image in printed image layer 325 depending on the angle at which the printed image is being viewed. At one angle, the printed image can be viewed in true color (as it was originally printed). At other viewing angles, diffraction grating layer 310 causes the printed image to appear tinted in different colors such as the colors of the rainbow.

In the implementation shown in FIG. 3, printed image layer 325 is below stored data layer 320 and diffraction layer 310. In other implementations, printed image layer 325 can be above data storage layer 320 and/or diffractive image layer 310.

If diffraction grating 310 overlies data storage layer 320 and printed image layer 325, diffraction grating 310 can be oriented such that it does not interfere with data storage layer 320, and, at a selected angle, a reader can faithfully extract the colors for data storage layer 320. In this configuration, diffraction grating 310 creates a rainbow effect for printed image layer 325 without affecting readout of data storage layer 320. Similarly, OVD 300 can be configured so that a diffractive image can be viewed without interference.

In the example illustrated in FIG. 3, nano-optical bits 345 can be readout from data storage layer 320 at viewing angle 340. Similarly, printed image 355 can be observed from printed image layer 325 at viewing angle 350.

The layers of the OVDs described above can comprise transparent materials, semitransparent materials, wavelength-sensitive materials, photo sensitive materials, photo resists, conductive materials, semiconductor materials, dielectric materials, glass, piezoelectric materials, metalized, contain polarized elements, polymer based material, metallic, glossy paper, paper, and the like, or a suitable combination of the above. Typically, at least one protective layer comprising one or more materials from the above list is added to at least one side of the device, for example to the top of the device. In some implementations, the added layer comprises an anti-scratch coating intended to protect the surface of an adjacent layer.

Diffractive Structures with Different Profiles

Encoding with nano-optical bits takes advantage of spectral signatures (such as wavelengths and colors) to store information, and additional variables can be introduced based on the orientation of optical bits.

It is generally desirable to make the encoding space even broader and more complex. Increasing the complexity of the encoding space increases the security of the stored data. One approach is to add an additional variable such as intensity or polarization of each optical bit. Considering the orientations of optical bits as in-plane variables, intensity and polarization can be considered out-of-plane variables. Intensity and polarization variables can be modified and controlled in different ways.

Figure 4:
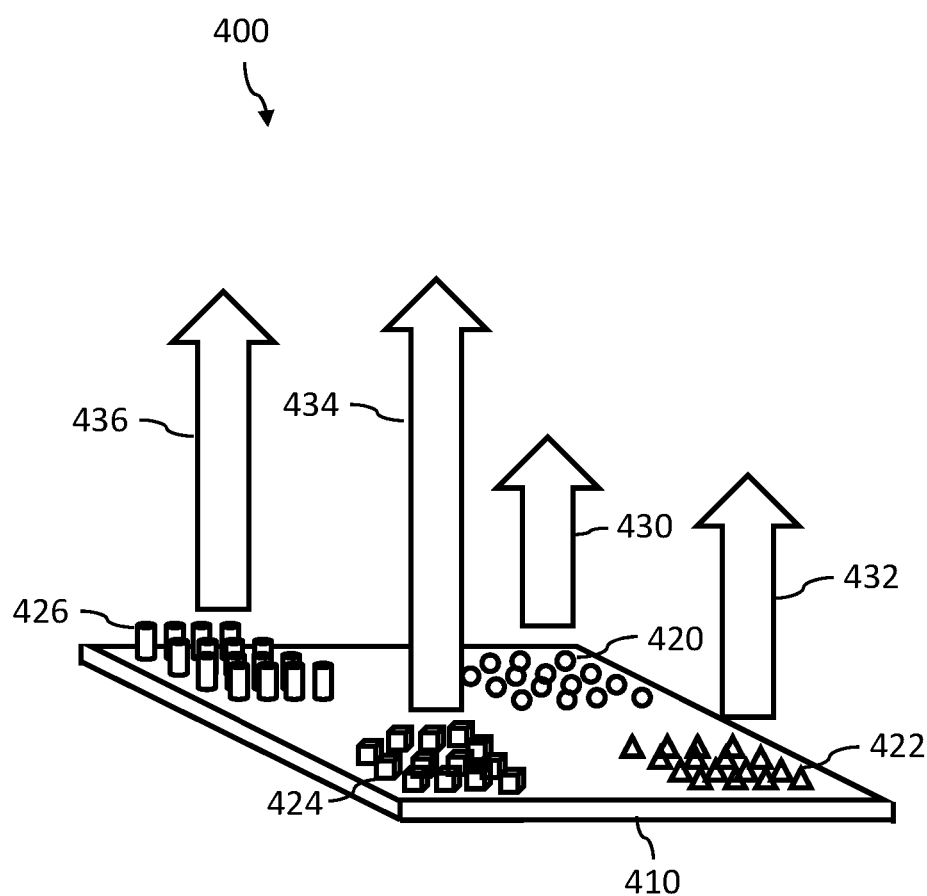
FIG. 4 is a schematic diagram of an OVD comprising diffractive structures with different profiles.

FIG. 4 is a schematic diagram of OVD 400 comprising diffractive structures with different profiles. OVD 400 can control and modify the intensity of nano-optical bits by using harmonic structures which are bits with integer multiples of the fundamental periodicities P of the bits (i.e., 2P, 3P . . . , and so on). These harmonic bit structures are capable of producing the same optical signal but with a lower intensity (with respect to the order of diffraction). The intensity can be measured and implemented as a variable.

OVD 400 comprises substrate 410 and regions 420, 422, 424, and 426 comprising diffractive structures with different profiles. Region 420 comprises diffractive structures with holes having a circular profile. Region 422 comprises diffractive structures with a pyramid profile. Region 424 comprises diffractive structures with a cuboid profile. Region 422 comprises diffractive structures with a pillar profile.

Periodic structures with different profiles and shapes can exhibit diffraction with different intensities. In the example embodiment shown in FIG. 4, regions 420, 422, 424, and 426 exhibit diffraction at intensities indicated by the height of arrows 430, 432, 434, and 436, respectively. Other suitable shapes and/or profiles can be used. Typically, structures with more edges diffract light with higher intensity.

In the embodiment shown in FIG. 4, nano-optical bits with the same, or similar, spacing in the diffractive structure can produce optical signals with different intensities. In other words, adjusting the profile of the nano-structures, without changing the spacing (periodicity), will result in differences in intensity between optical bits with the same, or similar, spacing.

The optical reader for OVD 400 comprises a meter for determining the intensity of refracted light, in addition to a sensor for detecting different colors.

In some implementations, structures operable to exhibit different intensities in the diffracted light comprise holes or indentations in substrate 410. In other implementations, structures operable to exhibit different intensities in the diffracted light comprise different materials and/or different thicknesses of materials.

In another embodiment, polarization of the transmitted or reflected beam can be used as a variable for encoding the stored data. Each nano-optical bit can comprise polarizing structures that polarize the beam. In some implementations, nano-optical bit data storage system can include both polarization and intensity as variables for representing and encoding the stored data.

The shape of the optical bits can also be used as a variable. For instance, a portion of the bits can be presented in square shapes while another portion of the bit shapes can be presented in circles, triangles, hexagons and other suitable geometrical shapes. Each nano-optical bit can be designed to produce the same optical signal while differing in shape and size where each parameter is adding an extra variable to the data storage system creating a more complex and secure environment for the stored data.

The aforementioned variables can be incorporated in an OVD as described above. The OVD is operable to store and represent different types of data including, but not limited to, image files (for example JPEG, TIFF, and GIFF), audio files (for example MP3, and WAV), video files (for example MP4, and MPEG), text files (for example txt, doc, and PDF), and binary files.

A data storage OVD such as OVDs described above in references to FIGS. 1 through 4 is suitable for storing large amounts of data in one or more formats, and in particular is suitable for storing data in applications where network connectivity is not an option. Authentication can be performed offline.

Plasmonics

In one embodiment, the nano-optical bits of a data storage OVD can be constructed from plasmonic structures. Arrays of plasmonic bits can be used for data storage, and this approach can be incorporated in the OVDs described in this application.

Plasmonic structures can generate surface plasmon once embedded or coated with suitable conductive materials such as gold, silver, aluminum, conductive polymers, and the like. The peak of plasmonic resonance in transmission or reflection can be detected and used for data representation and storage.

The plasmonic peak can be controlled by selecting the periodicity of the bits, the type and profile of the constituent nano-structures, the materials used for coating or embedding the structures and their thickness, and the type and thickness of the dielectric layer or layers that surround and cover the plasmonic structures.

Figure 5A:
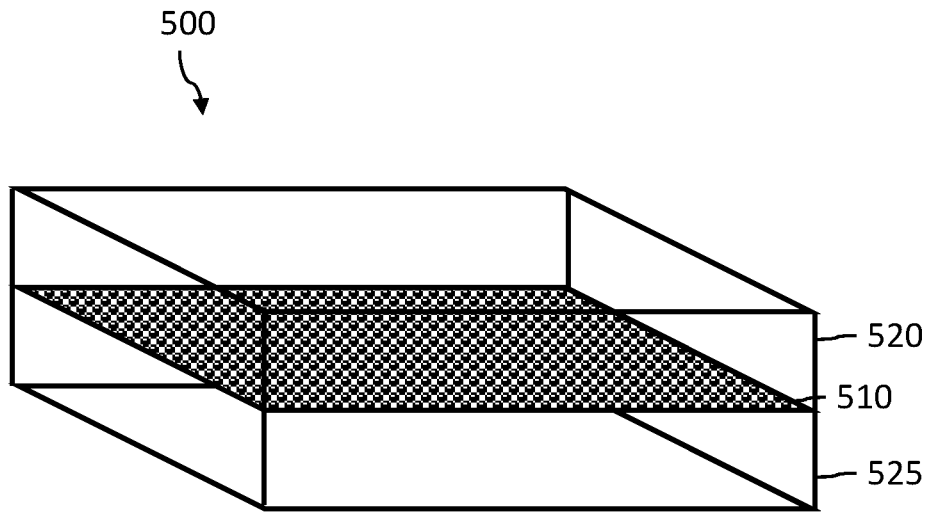
FIGS. 5A and 5B are schematic diagrams of an OVD comprising plasmonic structures.
Figure 5B:
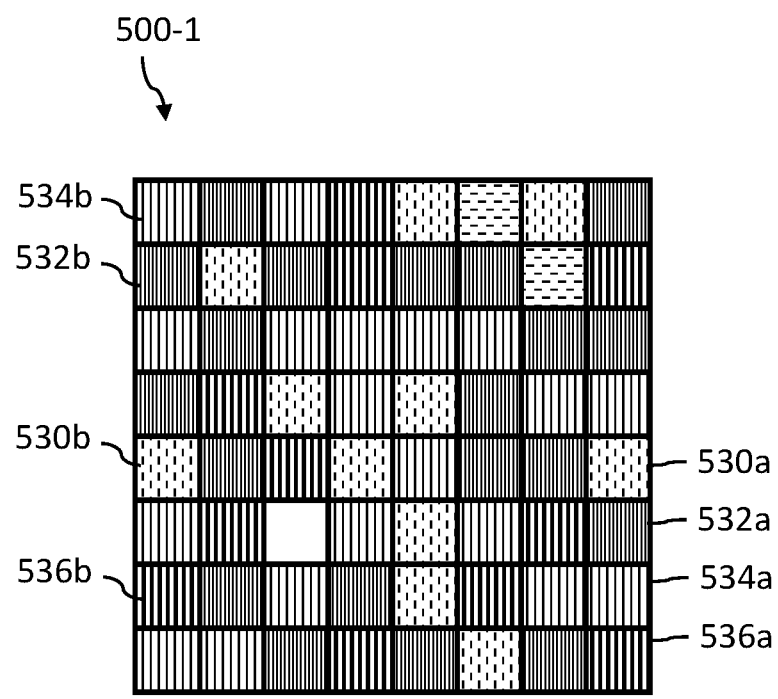

FIGS. 5A and 5B are schematic illustrations of an embodiment of OVD 500 comprising plasmonic structures. As shown in FIG. 5A, OVD 500 comprises data storage layer 510, and two secondary layers, upper layer 520 and lower layer 525, above and below data storage layer 510, respectively. Layer 510 comprises plasmonic structures. Layers 520 and 525 comprises dielectric or metallic materials.

FIG. 5B is a plan view of OVD 500 illustrating the nano-optical bits such as 530a through 536a, and 530b through 536b. In the example shown in FIG. 5B, the nano-optical bits comprise arrays of plasmonic structures with different periodicities. The periodicity of each array is selected to represent data using a multi-variable encoding system. Data is encoded in colors and each periodicity results in a different color. The pattern of colors encodes the data stored in OVD 500.

In FIG. 5B, the different periodicities of the arrays are illustrated by shading. For example, bits 530a and 530b comprise a first periodicity, bits 532a and 532b comprise a second periodicity, bits 534a and 534b comprise a third periodicity, and bits 536a and 536b comprise a fourth periodicity.

In one implementation, an optical reader (not shown in FIGS. 5A and 5B) to read out the data stored in data storage layer 510 of OVD 500 can comprise two sensors, a diffraction sensor and a transmission (and/or reflection) sensor. The diffraction sensor can read out the data. The transmission (and/or reflection) sensor can provide additional security. It can be beneficial to have a combination of diffraction and transmission (and/or reflection) sensors.

Biometrics

An OVD with a data storage component can be used for creating a hash file using biometric features such as fingerprints, retinal scans, and the like. A pattern of nanostructures, containing either information or a random pattern, can generate a unique optical signal, when illuminated.

Once a biometric feature such as a fingerprint comes in contact with a nano-optical pattern and is illuminated, a unique signal can be recorded, the unique signal comprising a convolution of the biometric feature and the optical signature of the nano-optical pattern. In other words, the convolution is unique to the specific combination of the biometric feature and the nano-optical pattern, and can be used to create a hash file in real-time. The unique signal (the combination of the biometric feature and the nano-optical pattern) can be stored in a database, and subsequently used to verify the authenticity of a person, for example a person in possession of an identification card or document.

The technique for authentication described above can be used to link an item (such as an identification card, a travel document, and the like) to an appropriate individual. The technique reduces or eliminates the possibility that personal identification features, such as biometrics, recorded by a device can be captured and/or hacked. In the technique described above, the biometrics are not recorded, and the generated optical pattern is a convolution of the biometrics and the pattern of nano-structures, and cannot be broken down by a third party into its constituents.

Figure 6:
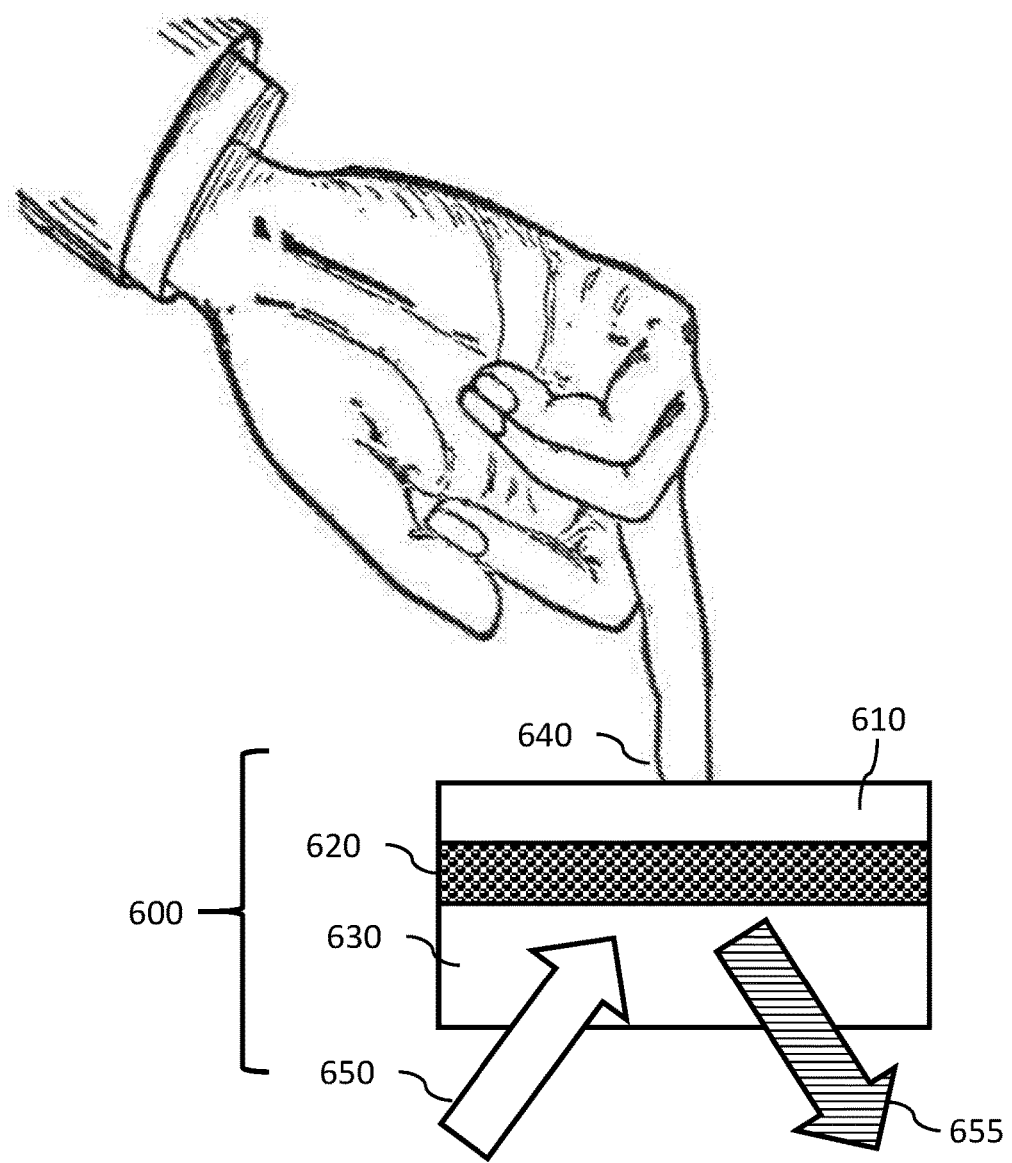
FIG. 6 is a schematic diagram illustrating a biometric optical reader using nano-optical bit structures.

FIG. 6 is a schematic diagram illustrating an embodiment of a biometric optical reader 600 using nano-optical bit structures. Biometric optical reader 600 comprises transparent platform 610, coded structure 620, and transparent substrate 630. When a finger 640 is placed on transparent platform 610, and illuminated from below by beam 650, biometric optical reader 600 produces modulated beam 655.

Modulated beam 655 comprises a representation of a fingerprint corresponding to finger 640 and a pattern derived from coded structure 620. In some embodiments, modulated beam 655 is a convolution of the fingerprint and the pattern derived from coded structure 620. Modulated beam 655 is secure i.e., the fingerprint cannot be deduced from modulated beam 655 without knowledge of a decoding algorithm corresponding to coded structure 620.

Image Representation

Nano-optical bits in an OVD (such as the OVDs described in this application) can be selectively and physically arranged in a pattern to represent a recognizable image. Since the nano-optical bits are operable to record a specific color, the recognizable image can simultaneously be an optically variable image i.e., an image for storing coded data. The data is stored in the arrangement of colored bits. A corresponding method can be used to decode the data.

A benefit of the encoding system described above is that it is difficult, if not impossible, to decode the data without knowledge of the decoding method and the angle at which to view the data to detect the encoded image.

The decoding method can be implemented in an embedded chip without passing through a digital interface. The chip can be protected against discovery by being operable to burn-out if an attempt is made to compromise it. Further protection can be provided by requiring authentication for a user or for software accessing data received from the chip.

Figure 7:
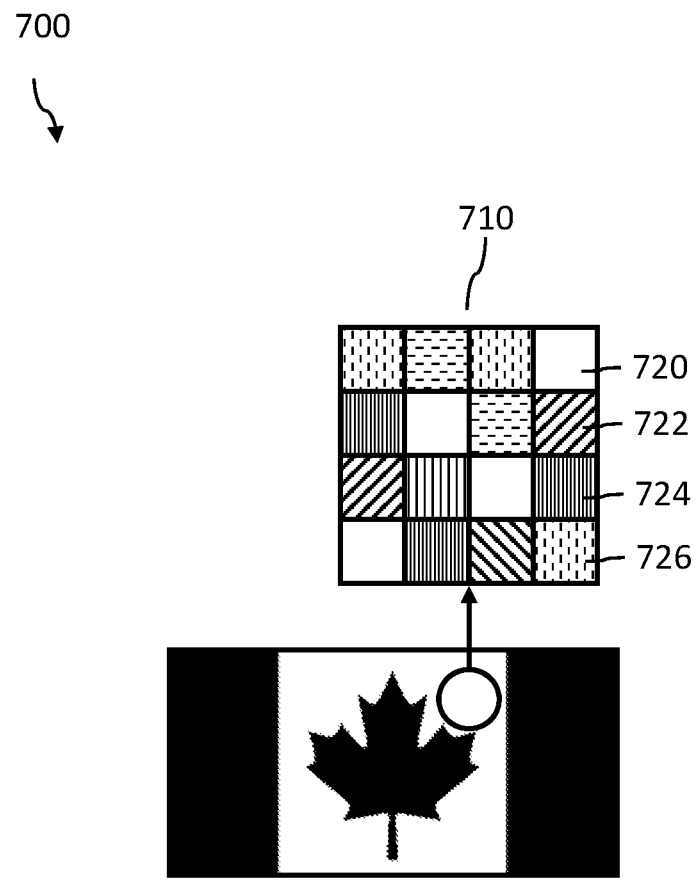
FIG. 7 is a schematic illustration of a data storage OVD with nano-optical bits arranged to represent an image.

FIG. 7 is a schematic illustration of a data storage OVD 700 with nano-optical bits arranged to represent an image. FIG. 7 shows portion 710 of OVD 700 expanded to highlight nano-optical bits including bits 720, 722, 724, and 726. In a color illustration, bits 720, 722, 724, and 726 would be represented by different colors such as red, green, blue, and yellow.

In the example shown in FIG. 7, the nano-optical bits are arranged to display a facsimile of a Canadian flag while, at the same time, representing data in a multi-variable encoding system.

Holographic-Based Nano-Optical Bit Data Storage Device

A nano-optical bit storage device can also take advantage of transmissive nano-structures to store and represent data using a laser beam. In this approach, the diffraction pattern of the arrays of nano-structures can be stored on a film, for example holographic film or a photopolymer, similar to recording a hologram.

Arrays of nano-optical bits are used to modulate the laser beam. Angle multiplexing can be used to increase data density i.e., to store more data in a given area of the device. The number of bits is dependent on the number of nano-arrays used to store the data.

Figure 8:
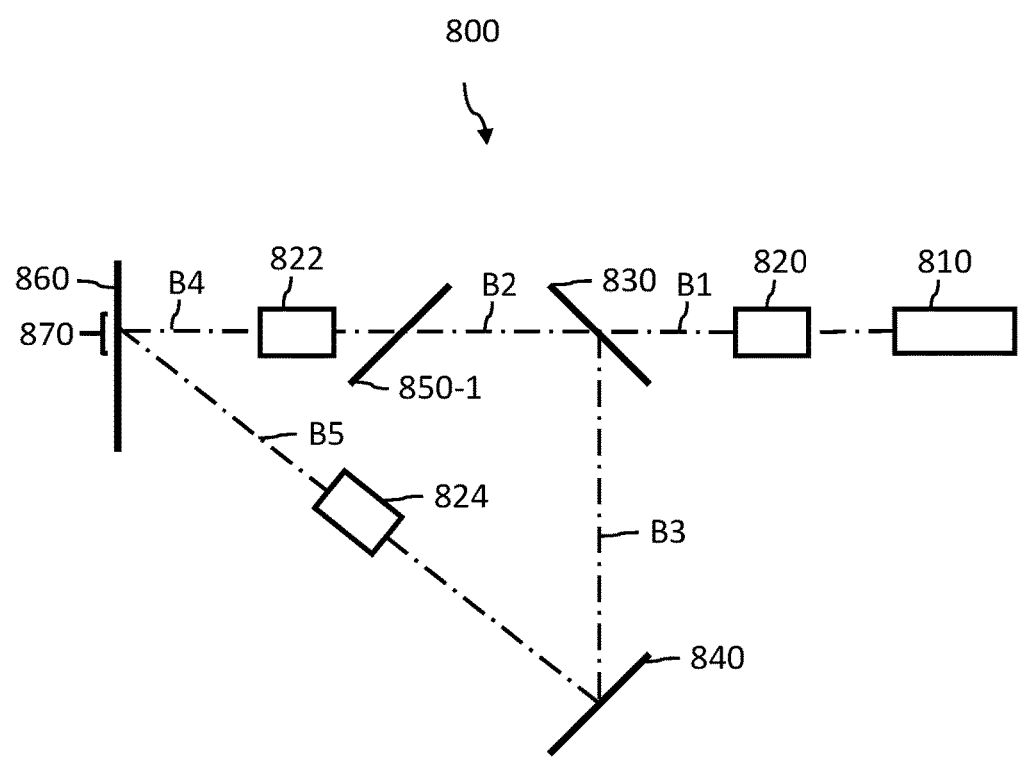
FIG. 8 is a schematic diagram of a holographic-based nano-optical bit data storage device (OVD).

FIG. 8 is a schematic diagram of a holographic-based nano-optical bit data storage device (OVD) 800. Holographic OVD 800 comprises laser 810, lenses 820, 822, and 824, beam splitter 830, reflector 840, nano-optical bit array 850-1, and holographic film 860.

Beam B1 from laser 810 is split into two beams B2 and B3 after passing through beam splitter 830. Beam B2 passes through nano-optical bit array 850-1. Nano-optical bit array 850-1 comprises a diffraction grating with a first periodicity. Beam B2 is modulated by transmission through nano-optical bit array 850-1 to form modulated beam B4. Modulated beam B4 is incident on holographic film 860.

Beam B3 is reflected by reflector 840 to form reference beam B5. Reference beam B5 is co-incident with modulated beam B3 on holographic film 860, i.e., beams B4 and B5 are incident on the same region 870 of holographic film 860 at the same time.

Each of the arrays of nano-structures is representing a nano-optical bit which is being recorded on the film. Each array is a variable that can be used to represent stored data. To store data using these arrays, the method illustrated in FIG. 8 records the interference pattern for each array.

Angle multiplexing can be used to store more than one pattern in a region of holographic film. Alternatively, the angle of the reference beam can be kept fixed and interference patterns recorded across the film for diffracted light from each array. In one implementation, a combination of the two methods can be used. The method can include moving reflector 840 to adjust the angle of incidence of the reference beam on the holographic film.

For example, for a nano-structure with periodicity P1, the reference beam has an angle $\alpha_1$ with a line normal to the plane of the holographic film at the incidence point on the holographic film. The method records an interference pattern between modulated beam B4 and reference beam B5, reference beam B5 incident at an angle $\alpha_1$.

For a nano-structure with periodicity P2, the reference beam has an angle $\alpha_2$ with a line normal to the plane of the holographic film at the same incidence point on the holographic film. The interference pattern of reference beam B5 and modulated beam B4 is recorded on the same region of the holographic film as for the nano-structure with periodicity P1, this time with a reference beam angle of $\alpha_2$. In practice, one or more patterns can be stored on the same region of the holographic film for a corresponding set of one or more reference beam angles.

Unlike other holographic techniques in the prior art, such as Holographic Versatile Discs (HCD), the technique described in this application stores data in a multi-variable encoding system rather than as binary variables. The multiple variables are represented by colors corresponding to each nano-optical bit array.

The data can be read out using reference beam B5. Reference beam B5 is used to illuminate region 870 of holographic film 860 at a selected angle to extract modulated beam B4. Modulated beam B4 can be detected by a conventional CMOS or a CCD sensor.

Alternatively, since the recorded interference pattern can exhibit diffraction, the data can be readout by detecting the color exhibited by the recorded interference pattern. In one implementation, a combination of this approach and the approach described in the previous paragraph can be used to readout the data.

The technique described above is suitable for recording small or large volumes of data, and can be adjusted accordingly. The readout device can be a dedicated optical reader or a sensor in an electronic device such as a cell-phone. If the data is recorded in 3D (i.e., with more than one pattern in the same region of the holographic film, the data layer extending into the film material), then a designated reading device is used for data extraction. If the data is recorded in 2D (one pattern per spot, the data layer residing on the surface of the film material) then the same cell-phone based color combination method can be used for decrypting the data.

The number of variables can be increased by adding more nano-arrays. An angular multiplexing technique to record multiple optical bit patterns on the same region of the holographic film can be used to increase data storage capacity.

The region of holographic film on which the recording is made is defined by a lens system comprising lenses 820, 822, and 824, and laser 810. The region can be adjusted by suitable selection of lenses 820, 822, and 824, and the type of laser 810 used to provide the light source.

A data storage device produced as described above can be used as a standalone storage medium and/or can be incorporated in OVDs described in this application.

Quantum Dots Storage Device

A multivariable optical storage device can use semiconductor nano-crystals as nano-optical bits. Semiconductor nano-crystals are also known as quantum dots (QDs). QD inks, which are commercially available and used in the security industry, can be used to represent data on wide range of materials.

QDs are capable of emitting light when excited, for example by irradiation with UV light, electrical current, heat, and the like. The emitted wavelength depends on the size of the nano-crystals. A QD-based multivariable storage device exploits the variation of emitted wavelength with size of the nano-crystals. Data can be stored as nano-crystals of varying sizes and the data can be read out by detecting the wavelengths emitted by the QDs after excitation. Data can be extracted using a decoding method while the QDs are excited.

In other embodiments, a fluorescent or phosphorescent pigment or ink can be used to represent information in a similar fashion.

In yet other embodiments, upconverting nano-particles and plasmonic nano-particles can be made into ink, and printed onto documents. The ink can be used to print the multivariable encoding system described above. The printed output can comprise pixels made of nano-particles such as QDs, upconverting nano-particles and plasmonic nano-particles. For example, the ink can be used to print a barcode.

Upconverting nano-particles can absorb infra-red (IR) and near IR (NIR) radiation and re-emit it in the visible spectrum. An IR or MR source excites and reads data stored in upconverting nano-particles. Plasmonic nano-particles can be made in different sizes and shapes, size and shape being used to control color, and color being used to encode the data. Plasmonic nano-particles exhibit a color-shift effect through dispersion of incident light.

A data storage device produced as described above can be used as a standalone storage medium and/or can be incorporated in OVDs described in this application.

Holographic QR Codes

In another embodiment, one or more barcodes such as QR codes can be used to produce an OVD. A combination of barcodes can be used to provide multiplexing as described in more detail below.

In barcode OVDs, the modules of the barcode (for example, each of the black or white blocks in a QR code) can be made of diffractive structures with periodicities ranging from nanometer to micrometer in size. The result is a barcode in which the barcode modules that represent the encoded data are selected to exhibit a color-shift effect similar to holograms. The color-shift effect refers to a diffraction effect similar to the effect of diffractive images described above. Like holograms, the barcode modules change color when tilted under illumination. The barcode OVD can be read by a barcode reader such as a QR code reader on a smartphone.

Figure 9:
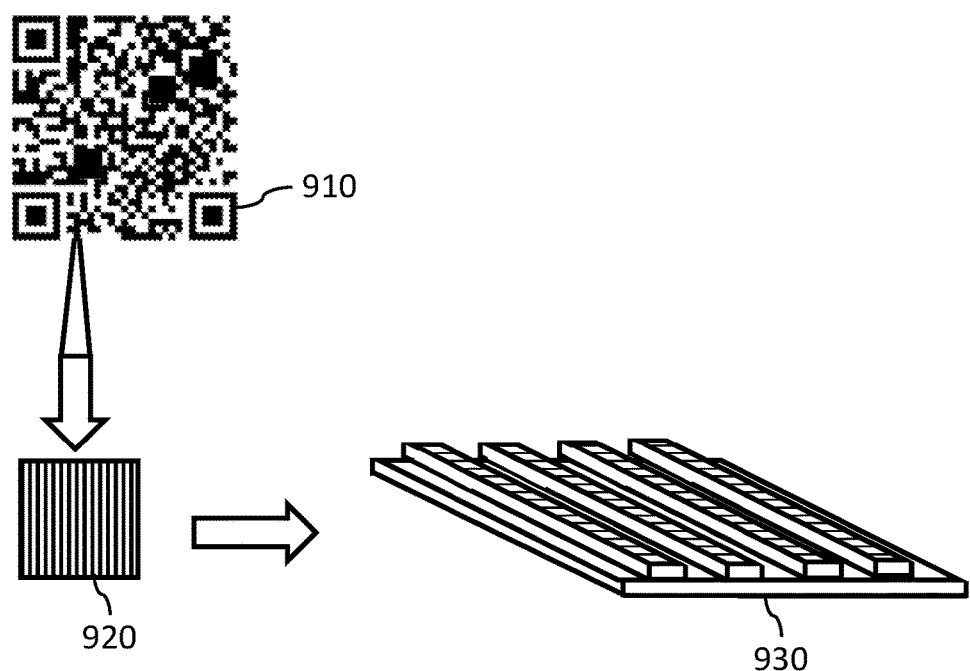
FIG. 9 is a schematic illustration of a holographic QR code.

FIG. 9 is a schematic illustration of holographic QR code 910. FIG. 9 also shows an expanded view of a portion of QR code 910 comprising single diffractive module 920. FIG. 9 also shows an expanded view of diffractive module 920, the view showing diffraction grating 930.

The technique described above can be implemented using one-dimensional barcodes and by using two-dimensional barcodes. Barcodes as described above contain a high level of security since they cannot be produced by a conventional 2D printer. They can be imprinted in or onto a wide variety of materials as mentioned earlier.

In one implementation, barcodes comprising diffractive nano-structures can be generated using a 3D printing technology.

Figure 10:
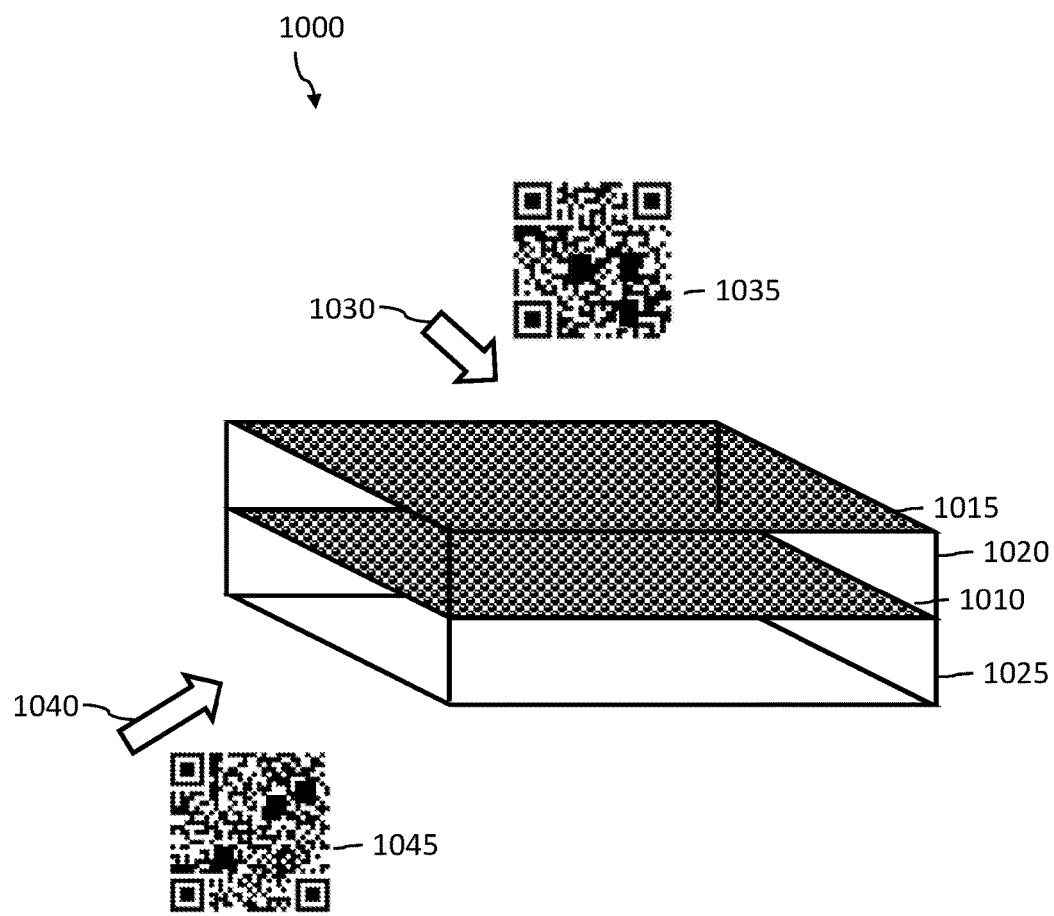
FIG. 10 is a schematic illustration of an OVD comprising angle-multiplexed diffractive barcodes.

Using a multiplexing technique, an OVD can be created where at least one diffractive image and one diffractive barcode are combined together at the same surface. The multiplexed OVD can comprise at least two barcodes. FIG. 10 is a schematic illustration of OVD 1000 comprising angle-multiplexed diffractive barcodes. OVD 1000 comprises two QR code layers 1010 and 1015 for data storage. OVD 1000 further comprises two substrate layers 1020 and 1025.

When OVD 1000 is illuminated from a direction indicated by arrow 1030, an optical reader (not shown in FIG. 10) can read out QR code 1035. When OVD 1000 is illuminated from a direction indicated by arrow 1040, the optical reader can read out QR code 1045. Though FIG. 10 illustrates an example with two data storage layers, other implementations can comprises more than two data storage layers.

Barcode modules can also be populated with nano-optical bits and used to store data that can be read by an electronic device such as a cellphone or a special-purpose device.

The security barcode system described above in reference to FIGS. 9 and 10 can be incorporated in OVDs, methods, and materials described in this application.

Refractive Index Embodiment (3D Storage)

In a 3D data storage image, data is stored in different layers of polymers, each polymer having a characteristic refractive index, and the different layers having a different refractive indices. The approach allows coded patterns in the nano-structures to be viewed in different positions by virtue of the difference in the refractive indices.

Figure 11:
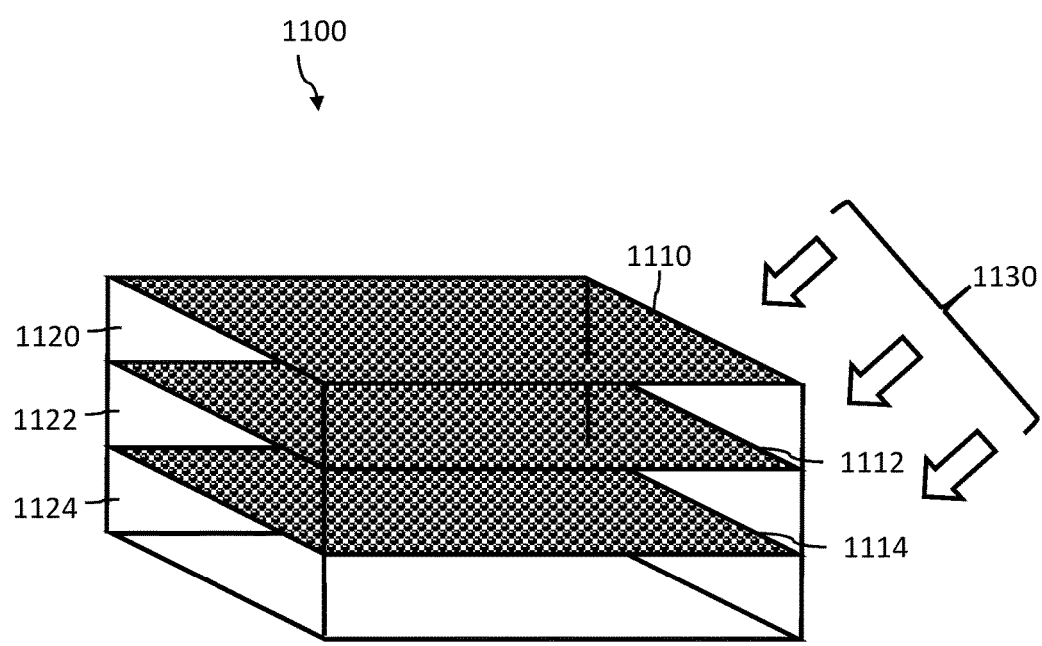
FIG. 11 is a schematic diagram of a multilayer OVD.

FIG. 11 is a schematic diagram of an embodiment of a multilayer OVD 1100. Multilayer OVD 1100 comprises three stored data layers 1110, 1112, and 1114 on top of three substrate layers 1120, 1122, and 1124, respectively. In operation, multilayer OVD 1100 is illuminated by light beam 1130.

Polymer Coding

In another embodiment, a patch of a polymer can be applied over a diffractive structure. The polymer can be selected to have a characteristic refractive index. More than one polymer can be applied, one polymer per diffractive structure, each of the polymers selected to have a characteristic refractive index that can be varied from one polymer to another.

The resulting OVD comprises diffraction structures with a periodicity in common with each other, and a refractive index that can vary from one diffraction structure to another. The varying refractive index can result in a shift in the color recorded when reading out the OVD at a particular fixed viewing angle. As described above in reference to other embodiments, data can be encoded in the colors corresponding to the diffraction structures (or bits). The encoding can be achieved by applying polymers to the bits, the polymers having appropriately selected characteristic refractive indices to provide a desired color.

In another embodiment, the periodicity of the diffraction structure and the refractive index of the polymer can both be varied between bits.

Figure 12:
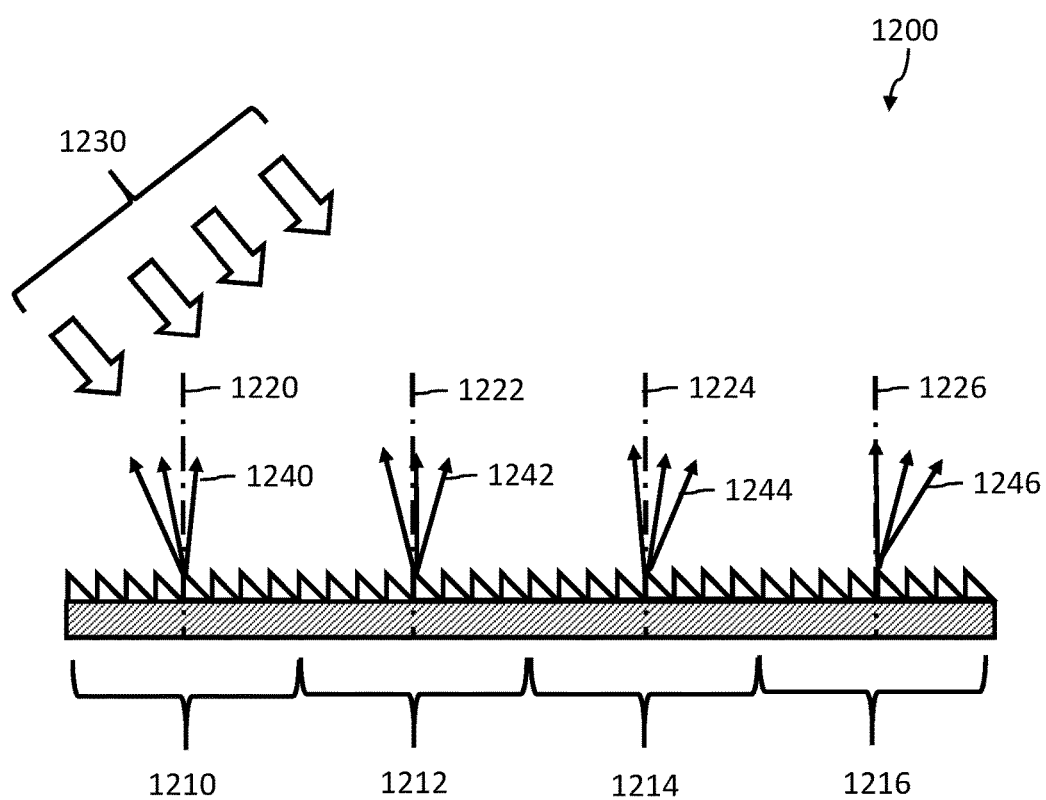
FIG. 12 is a schematic side view of a data storage layer comprising polymer encoded nano-optical bits.

FIG. 12 is a schematic side view of data storage layer 1200 comprising polymer encoded nano-optical bits. Data storage layer 1200 comprises regions 1210, 1212, 1214, and 1216, each region comprising a diffraction region coated with a polymer having a selected characteristic refractive index.

The normal to the diffraction structures in regions 1210, 1212, 1214, and 1216 are 1220, 1222, 1224, and 1226, respectively. OVD 1200 is illuminated by light 1230. Light 1230 reflects at different angles for each color as indicated by sets of arrows 1240, 1242, 1244, and 1246, respectively. The presence of the polymer coating on the diffraction grating changes the perceived color at a given viewing angle.

Fabrication of OVDs

The OVDs described above (with or without the data storage component) can be fabricated using conventional micro/nano-fabrication techniques and devices such as electron-beam lithography, ion-beam lithography, focused-ion beam, nano-imprint lithography, roll to roll, hand casting, hot embossing, photolithography, deep UV lithography, laser interference lithography, maskless lithography, and the like.

Different layers of multilayer OVDs can be applied using spin-coating, spray-coating, hot press or other standard or unconventional techniques, and the layers can be stacked on top of each other.

OVD Applications

The OVDs described above can be used for a range of applications with requirements including, but not limited to, the following:
- a high level of security for data storage,
- the storing of sensitive data for a long period of time,
- the authentication of an item,
- archiving high value information,
- brand protection,
- physically unclonable unique object functions, and
- tracking of items.

In addition, applications include, but are not limited to, the following:
- access management for high security facilities,
- government regulated products, security and authentication,
- security conscious organizations, and
- pharmaceutical applications, and
- other suitable applications in which OVDs can be used.

Reader Device System

Figure 13:
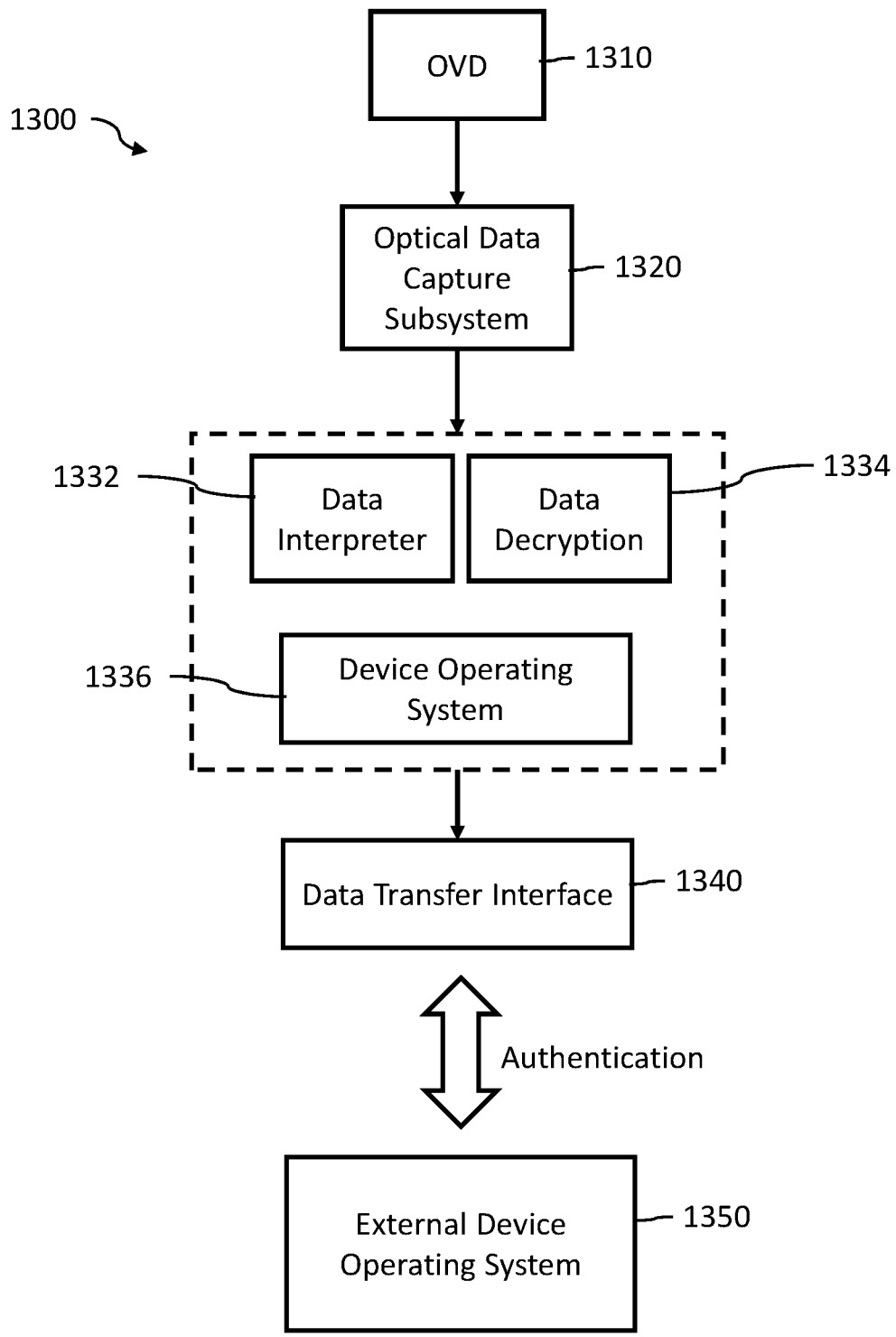
FIG. 13 is a block diagram illustrating a reader device system.

FIG. 13 is a block diagram illustrating an embodiment of reader device system 1300. System 1300 comprises OVD 1310, optical capture subsystem 1320, optical data interpreter 1332, data decryption subsystem 1334, and device operating system 1336.

OVD 1310 comprises encrypted data as described in previous paragraphs with references to FIGS. 1 through 12. Optical capture subsystem 1320 comprises an optical system that captures data from OVD 1310 using a predetermined viewing direction and angle of incidence. Optical data interpreter 1332 comprises a microcontroller. In one implementation, optical data interpreter 1332 comprises an application specific integrated circuit (ASIC) operable to transform captured optical data into numerical data.

Data decryption subsystem 1334 comprises a data decryption secure microcontroller, which is an ASIC that contains the specific functions and algorithms for decrypting the numerical data. The term "secure" defines the structure of the ASIC in such way that attempts at reverse engineering the ASIC through accessing the firmware will result in physical burn-out of the interface gates. Consequently, the ASIC's functionality cannot be accessed through its embedded software. In some implementations, the ASIC comprises cryptographic machine code that hides the ASIC's actual functionality.

System 1300 further comprises data transfer interface 1340 and external device operating system 1350. Authentication of OVD 1310 is performed between data transfer interface 1340 and external device operating system 1350.

Optical Reader

Figure 14A:
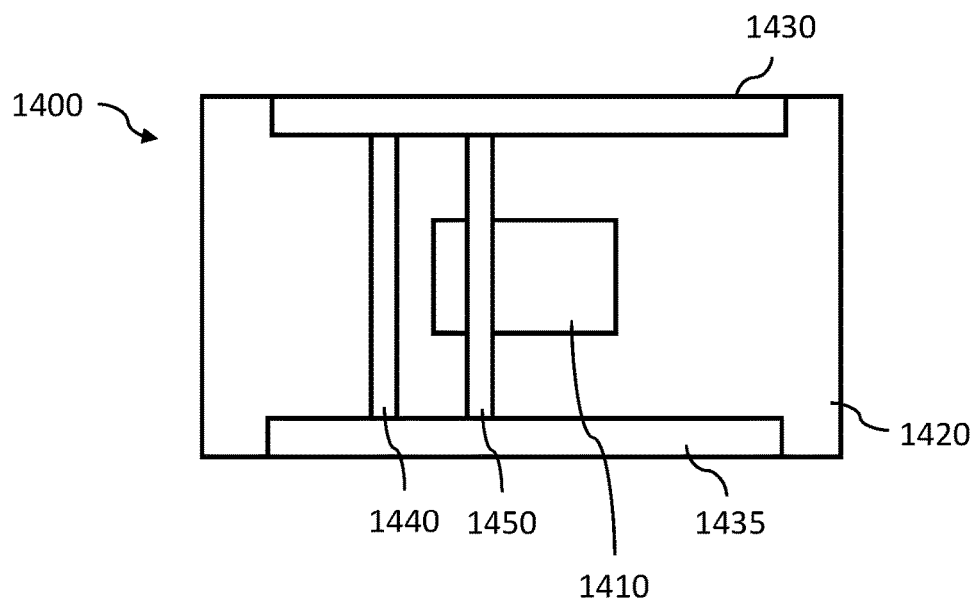
FIG. 14A is a schematic plan view of an implementation of an optical reader.
Figure 14B:
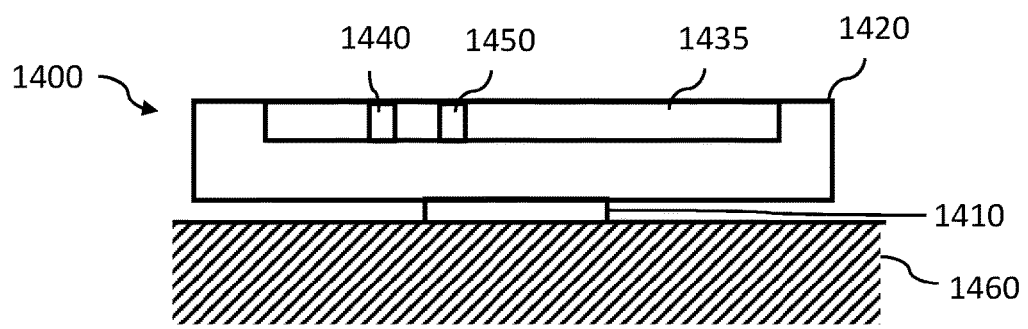
FIG. 14B is a schematic side view of the optical reader of FIG. 14A.

FIG. 14A is a schematic plan view of an example implementation of optical reader 1400. FIG. 14B is a schematic side view of optical reader 1400 of FIG. 14A. Optical reader 1400 can be used to read OVD 1410 incorporated for example on a card or document. Optical reader 1400 comprises body 1420, rails 1430 and 1435, collimated light source 1440, and detector 1450. Optical reader further comprises platform 1460. OVD 1410 can be placed on platform 1460 or inserted into optical reader 1400 through a slot (not shown in FIGS. 14A and 14B).

Optical reader 1400 is an example embodiment. Other suitable embodiments and methods can be used to read out OVDs, including OVDs described above. Optical 1400 detects light reflected by diffraction gratings in OVD 1410. In some embodiments, for example, with a suitable selection of transparent substrate materials, the colors encoding the data can be detected in light transmitted through OVD 1410.

The embodiments of OVDs, and their associated methods and materials, described above and in reference to FIG. 1 through FIG. 13 can be used individually or in various suitable combinations.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A reader device system comprising:
   (a) an optically variable storage device configured to store data encoded in a plurality of optical bits in a data storage layer, wherein said optically variable storage device comprising:
      (i) said data storage layer comprising said plurality of optical bits encoding said data wherein said optical bits are selectively readable when said data storage layer is illuminated at a first predetermined direction and a first angle of incidence with respect to said data storage layer;
      (ii) an upper layer overlying said data storage layer;
      (iii) a lower layer overlain by said data storage layer, wherein said upper layer and said lower layer comprising at least one of a dielectric material and a metallic material, and each of said plurality of bits has a respective spectral signature; and
      (iv) a secondary storage layer configured to store secondary data, wherein said secondary data is selectively readable when said secondary storage layer is illuminated at a predetermined secondary direction and secondary angle of incidence with respect to said secondary storage layer, wherein at least one of said secondary direction and said secondary angle of incidence is different from said respective first direction and said first angle of incidence with respect to said data storage layer, wherein each of said plurality of optical bits comprises a respective array of diffractive structures.

2. The reader device system of claim 1, said optically variable storage device further comprising:
   (v) a first coating of a first polymer overlying a first optical bit of said plurality of optical bits, said first optical bit having a first spectral signature, wherein said first polymer is selected to have a first refractive index that modifies said first spectral signature.

3. The reader device system of claim 2, wherein said first optical bit comprises an array of plasmonic structures having a first periodicity.

4. The reader device system of claim 3, said optically variable storage device further comprising:
   (vi) a second optical bit of said plurality of optical bits, said second optical bit comprising an array of plasmonic structures having a second periodicity, said second optical bit having a second spectral signature; and
   (vii) a second coating of a second polymer overlying said second optical bit, wherein said second polymer is selected to have a second refractive index that modifies said second spectral signature.

5. The reader device system of claim 4, wherein said second periodicity is the same as said first periodicity.

6. The reader device system of claim 1 wherein a periodicity of said respective array of diffractive structures is between substantially one nanometer to one thousand micrometers.

7. The reader device system of claim 1 wherein said upper layer and said lower layer serve at least one of the following functions: protecting said data storage layer, enhancing a brightness of said optically variable device, concealing a coded pattern, and changing an optical path.

8. The reader device system of claim 1 wherein said secondary data comprises a diffractive image.

9. The reader device system of claim 1 wherein said data storage layer and said secondary storage layer are formed on the same surface.

10. The reader device system of claim 1 wherein said data storage layer comprises at least one diffractive barcodes.

11. A reader device system comprising:
   (a) an optically variable storage device configured to store data encoded in a plurality of optical bits in a data storage layer, wherein said optically variable storage device comprising:
      (i) said data storage layer comprising said plurality of optical bits encoding said data wherein said optical bits are selectively readable when said data storage layer is illuminated at a first predetermined direction and a first angle of incidence with respect to said data storage layer;
      (ii) an upper layer overlying said data storage layer;
      (iii) a lower layer overlain by said data storage layer, wherein said upper layer and said lower layer comprising at least one of a dielectric material and a metallic material, and each of said plurality of bits has a respective spectral signature;
      (iv) a secondary storage layer configured to store secondary data, wherein said secondary data is selectively readable when said secondary storage layer is illuminated at a predetermined secondary direction and secondary angle of incidence with respect to said secondary storage layer, wherein at least one of said secondary direction and said secondary angle of incidence is different from said respective first direction and said first angle of incidence with respect to said data storage layer, wherein said secondary data layer comprises a printed image; and
      (v) a diffraction grating interposed between said data storage layer and said printed image, wherein when said printed image is viewed through said diffraction grating at a first viewing angle said printed image has a first coloring, and when said printed image is viewed through said diffraction grating at a second viewing angle said printed image has a second coloring.

12. The reader device system of claim 1 wherein at least one of said plurality of optical bits encode said data in said data storage layer using spectral signatures and orientation of said plurality of optical bits as variables.

13. The reader device system of claim 12 wherein said plurality of optical bits encode said data in said data storage layer using spectral signatures and at least one of intensity and polarization of light received from said optically variable storage device in response to illumination of said data storage layer as variables.

14. The reader device system of claim 13 wherein a first and a second optical bit of said plurality of optical bits comprises at least one of:
   (i) an array of diffractive structures having a first and a second three-dimensional profile respectively,
   (ii) an array of diffractive structures having a first and a second diffractive harmonic structure respectively, and
   (iii) an array of diffractive structures having a first and a second thickness respectively.

15. A reader device system comprising:
   (a) an optically variable storage device configured to store data encoded in a plurality of optical bits in a data storage layer, wherein said optically variable storage device comprising:
      (i) said data storage layer comprising said plurality of optical bits encoding said data wherein said optical bits are selectively readable when said data storage layer is illuminated at a first predetermined direction and a first angle of incidence with respect to said data storage layer;

(ii) an upper layer overlying said data storage layer;

(iii) a lower layer overlain by said data storage layer, wherein said upper layer and said lower layer comprising at least one of a dielectric material and a metallic material, and each of said plurality of bits has a respective spectral signature; and (iv) a secondary storage layer configured to store secondary data, wherein said secondary data is selectively readable when said secondary storage layer is illuminated at a predetermined secondary direction and secondary angle of incidence with respect to said secondary storage layer, wherein at least one of said secondary direction and said secondary angle of incidence is different from said respective first direction and said first angle of incidence with respect to said data storage layer;

(b) an optical capture subsystem operable to read data from said optically variable storage device;

(c) an optical data interpreter configured to interpret said respective spectral signature of said data read and to generate interpreted data, wherein said optical capture subsystem is communicably couplable to said optical data interpreter; and (d) a data decryption subsystem configured to decode said interpreted data, wherein said data decryption subsystem is communicably couplable to said optical data interpreter, where each of said plurality of optical bits comprises an array of diffractive structures.

16. The reader device system of claim 15, said optically variable storage device further comprising a coating of a polymer overlying at least one of said plurality of optical bits, wherein said polymer has a refractive index that modifies the respective spectral signature of at least one of said plurality of optical bits.

* * * * *